(12) United States Patent
Landis et al.

(10) Patent No.: US 11,632,210 B2
(45) Date of Patent: Apr. 18, 2023

(54) ENHANCED PHASE TRACKING REFERENCE SIGNAL

(71) Applicant: QUALCOMM Incorporated, San Diego, CA (US)

(72) Inventors: Shay Landis, Hod Hasharon (IL); Assaf Touboul, Netanya (IL); Noam Zach, Kiryat Ono (IL); Idan Michael Horn, Hod Hasharon (IL); Daniel Paz, Geva Carmel (IL); Ory Eger, Tel Aviv (IL); Amit Bar-Or Tillinger, Tel-Aviv (IL); Michael Levitsky, Rehovot (IL)

(73) Assignee: QUALCOMM Incorporated, San Diego, CA (US)

( * ) Notice: Subject to any disclaimer, the term of this patent is extended or adjusted under 35 U.S.C. 154(b) by 47 days.

(21) Appl. No.: 17/314,952

(22) Filed: May 7, 2021

(65) Prior Publication Data

US 2021/0351889 A1    Nov. 11, 2021

Related U.S. Application Data

(60) Provisional application No. 63/022,199, filed on May 8, 2020.

(51) Int. Cl.
*H04L 5/00* (2006.01)
*H04L 1/00* (2006.01)

(52) U.S. Cl.
CPC .......... *H04L 5/0048* (2013.01); *H04L 1/0003* (2013.01); *H04L 1/0071* (2013.01)

(58) Field of Classification Search
None
See application file for complete search history.

(56) References Cited

U.S. PATENT DOCUMENTS

| | | | |
|---|---|---|---|
| 2019/0260466 A1* | 8/2019 | Bai | H04B 7/2603 |
| 2020/0045653 A1* | 2/2020 | Hunukumbure | H04B 7/0452 |
| 2020/0067628 A1* | 2/2020 | Xu | H04L 1/0004 |
| 2020/0106584 A1* | 4/2020 | Jiang | H04L 1/0029 |
| 2021/0281447 A1* | 9/2021 | Murakami | H04L 25/0224 |
| 2021/0298050 A1* | 9/2021 | Park | H04W 72/0413 |
| 2022/0094496 A1* | 3/2022 | Xiong | H04L 5/001 |
| 2022/0256519 A1* | 8/2022 | Jeon | H04W 72/044 |

\* cited by examiner

*Primary Examiner* — Otis L Thompson, Jr.
(74) *Attorney, Agent, or Firm* — Arent Fox, LLP

(57) ABSTRACT

A phase tracking reference signal (PTRS) may be enhanced to carry data encoded with a relative low modulation and coding scheme (MCS). A receive device may receiving a data channel, the data channel including a transport block encoded using a first MCS. The receiving device may receiving a PTRS interleaved with the data channel. The PTRS is encoded with the second MCS that is lower than the first MCS. The receiving device may decode the PTRS to determine PTRS data. The receiving device may track phase noise using the PTRS data as a transmitted sequence of the PTRS. The receiving device may decode the transport block for the data channel based on the first MCS and the tracked phase noise.

30 Claims, 9 Drawing Sheets

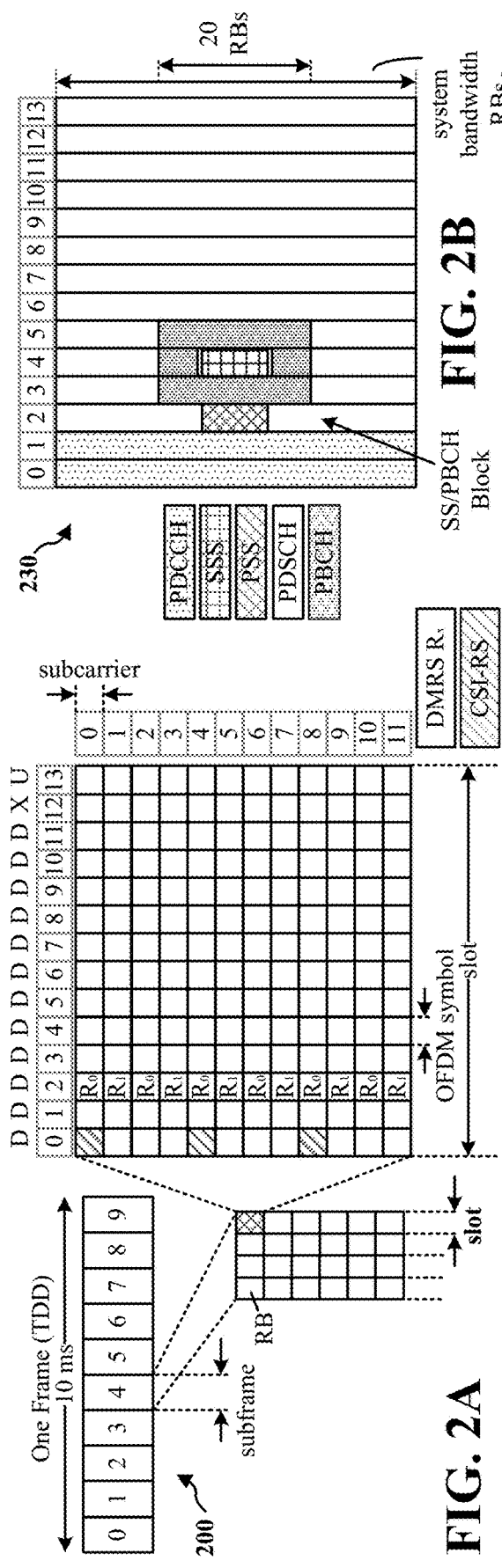
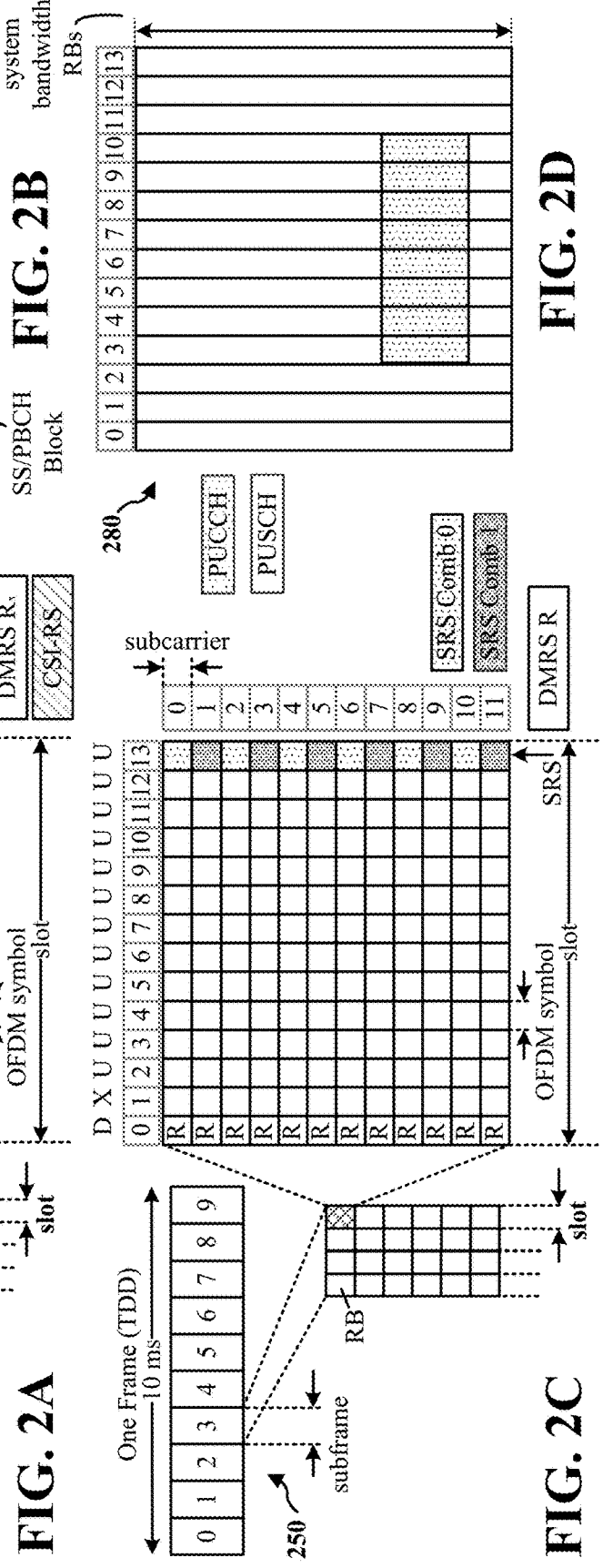

ENHANCED PHASE TRACKING REFERENCE SIGNAL

CROSS REFERENCE TO RELATED APPLICATIONS

This application claims priority to U.S. Provisional Application No. 63/022,199 titled "ENHANCED PHASE TRACKING REFERENCE SIGNAL," filed May 8, 2020, which is assigned to the assignee hereof, and incorporated herein by reference in its entirety.

BACKGROUND

Technical Field

The present disclosure relates generally to communication systems, and more particularly, to an enhanced phase tracking reference signal that carries data.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the disclosure provides a method of wireless communication for a transmitting device. The method may include receiving a data channel, the data channel including a transport block encoded using a first modulation and coding scheme (MCS). The method may include receiving a phase tracking reference signal (PTRS) interleaved with the data channel, wherein the PTRS is encoded with a second MCS that is lower than the first MCS. The method may include decoding the PTRS to determine PTRS data. The method may include tracking phase noise using the PTRS data as a transmitted sequence of the PTRS. The method may include decoding the transport block for the data channel based on the first MCS and the tracked phase noise.

The disclosure also provides an apparatus (e.g., a base station or a user equipment (UE)) including a memory storing computer-executable instructions and at least one processor configured to execute the computer-executable instructions to perform the above method, an apparatus including means for performing the above method, and a non-transitory computer-readable medium storing computer-executable instructions for performing the above method.

In an aspect, the disclosure provides a method of wireless communication for a receiving device. The method may include generating a transport block for a data channel, the transport block encoded using a first MCS. The method may include generating PTRS based on PTRS data encoded with a second MCS that is lower than the first MCS. The method may include transmitting the PTRS interleaved with the data channel.

The disclosure also provides an apparatus (e.g., a base station or a UE) including a memory storing computer-executable instructions and at least one processor configured to execute the computer-executable instructions to perform the above method, an apparatus including means for performing the above method, and a non-transitory computer-readable medium storing computer-executable instructions for performing the above method.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first 5G NR frame.

FIG. 2B is a diagram illustrating an example of DL channels within a 5G NR subframe.

FIG. 2C is a diagram illustrating an example of a second 5G NR frame.

FIG. 2D is a diagram illustrating an example of UL channels within a 5G NR subframe.

DETAILED DESCRIPTION

Figure 1:
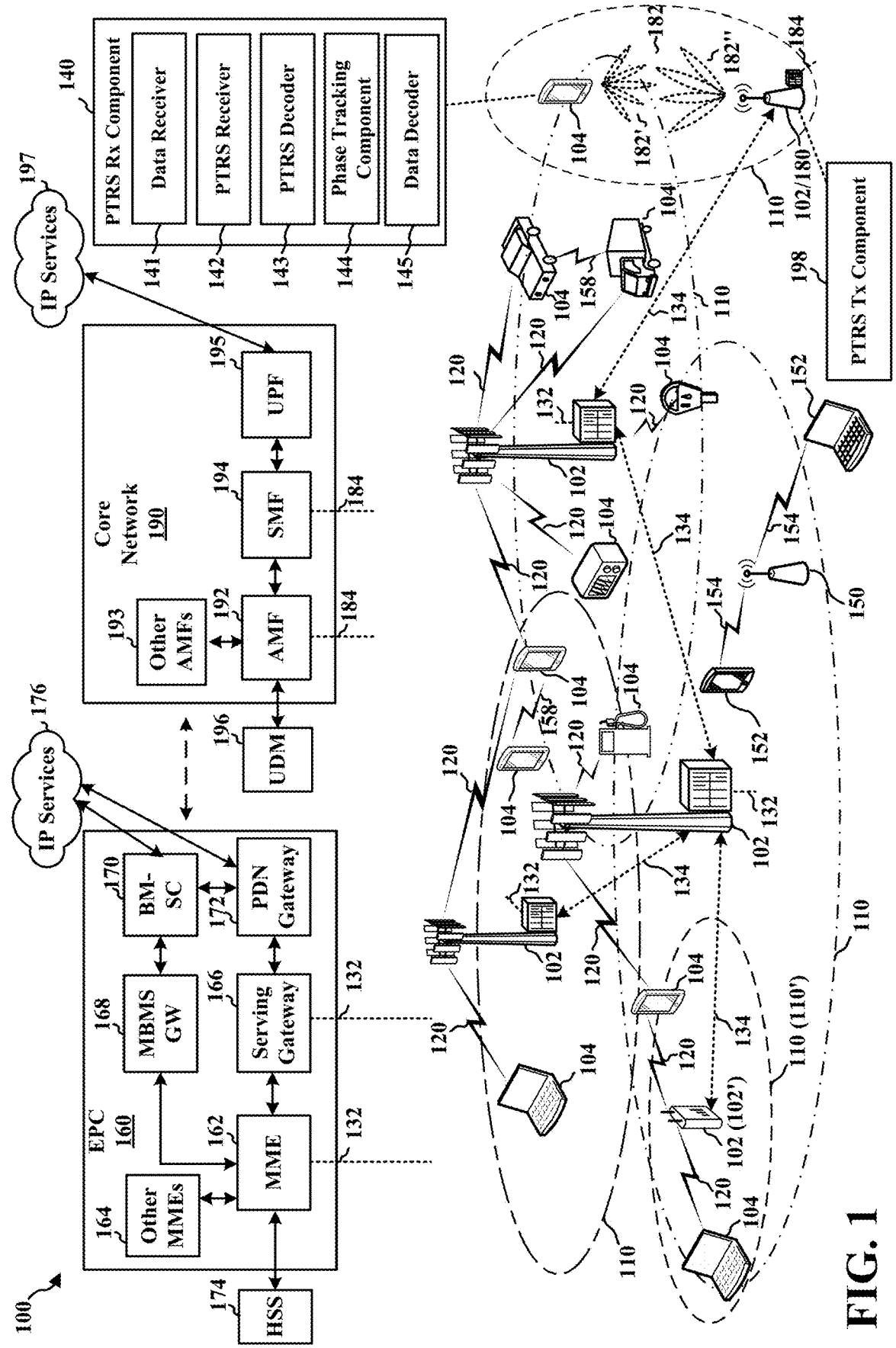
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In millimeter wave (mmW) frequencies such as in frequency range 2 (FR2) (defined in 3GPP TS 38.101 as 24250 MHz-52600 MHz), phase noise may introduce a noise floor of approximately 30 dB to signal to noise ratio (SNR). A phase tracking reference signal (PTRS) allows tracking of phase noise. A device receiving the PTRS may track phase noise associated with a data channel and subtract the phase noise from the received signal, reducing the noise and improving the SNR. The PTRS may be transmitted as a known sequence, for example, using a pseudo-random sequence generator with defined inputs. The PTRS is applicable when the SNR is good (e.g., above 20 dB) and a higher order modulation and coding scheme (MCS) is selected.

In an aspect, because the SNR may be assumed to be good when PTRS is applicable, the PTRS may be enhanced to carry data. In particular, the PTRS may be encoded with a MCS that is lower than the MCS selected for the data channel. A PTRS carrying data may be referred to as an enhanced PTRS (ePTRS). An ePTRS may improve spectral efficiency as reference signal resources may also be used to carry user data. In an aspect, the ePTRS may be suitable for carrying certain types of data that may be beneficial to transmit with a lower latency or round trip time than a data channel transport block. For example, transmitting symbol or code block group (CBG) level acknowledgments (ACK) or negative acknowledgments (NACK) or transport control protocol (TCP) ACK/NACK on the ePTRS may improve retransmission latency. As another example, a peak suppression information message (PSIM) may allow a reduction in peak to average power ratio (PAPR) of the data channel, which may result in reduced power consumption while maintaining data throughout rates.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In an aspect, as illustrated, one or more of the base stations 102 may include a PTRS transmit (Tx) component 198 configured to transmit an enhanced PTRS carrying data. As illustrated in further detail in FIG. 4, the PTRS Tx component 198 may include a data encoder 440 configured to generate a transport block for a data channel, the transport block encoded using a first MCS; a PTRS encoder 442 configured to generate a PTRS based on PTRS data encoded with a second MCS that is lower than the first MCS; and a transmitter component 452 configured to transmit the PTRS interleaved with the data channel. In various aspects, the PTRS Tx component 198 may optionally include a receiver component 450 configured to receive a data channel and a decoder 444 configured to determine a CBG level ACK/NACK or a TPC ACK/NACK; an interleaver 446 configured to interleave the data channel and the PTRS, and an inverse fast Fourier transform (IFFT) component 448 configured to transform a frequency domain signal into a time domain signal. Although the PTRS Tx component 198 is illustrated as a component of a base station, a UE 104 may include a PTRS Tx component 198 for uplink transmissions.

In an aspect, as illustrated, one or more of the UEs 104 may include a PTRS receive (Rx) component 140 that receives an enhanced PTRS. The PTRS Rx component 140 may include a data receiver 141 configured to receive a data channel, the data channel including a transport block encoded using a first MCS; a PTRS receiver 142 configured to receive a PTRS interleaved with the data channel and encoded with a second MCS that is lower than the first MCS; a PTRS decoder 143 configured to decode the PTRS to determine PTRS data; a phase tracking component 144 configured to track phase noise using the PTRS data as a transmitted sequence of the PTRS; and a data decoder 145 configured to decode the transport block for the data channel based on the first MCS and the tracked phase noise. Although the PTRS Rx component 140 is illustrated as a component of the UE 104, one or more base stations 102 may include a PTRS Rx component 140 for uplink transmissions.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface), which may be wired or wireless. The base stations 102 configured for 5G NR (collectively referred to as Next Generation RAN (NG-RAN)) may interface with core network 190 through second backhaul links 184, which may be wired or wireless. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" (mmW) band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band. Communications using the mmW radio frequency band have extremely high path loss and a short range. The mmW base station 180 may utilize beamforming 182 with the UE 104 to compensate for the path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Although the following description may be focused on 5G NR, the concepts described herein may be applicable to other similar areas, such as LTE, LTE-A, CDMA, GSM, and other wireless technologies including future 6G technologies.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PTRS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
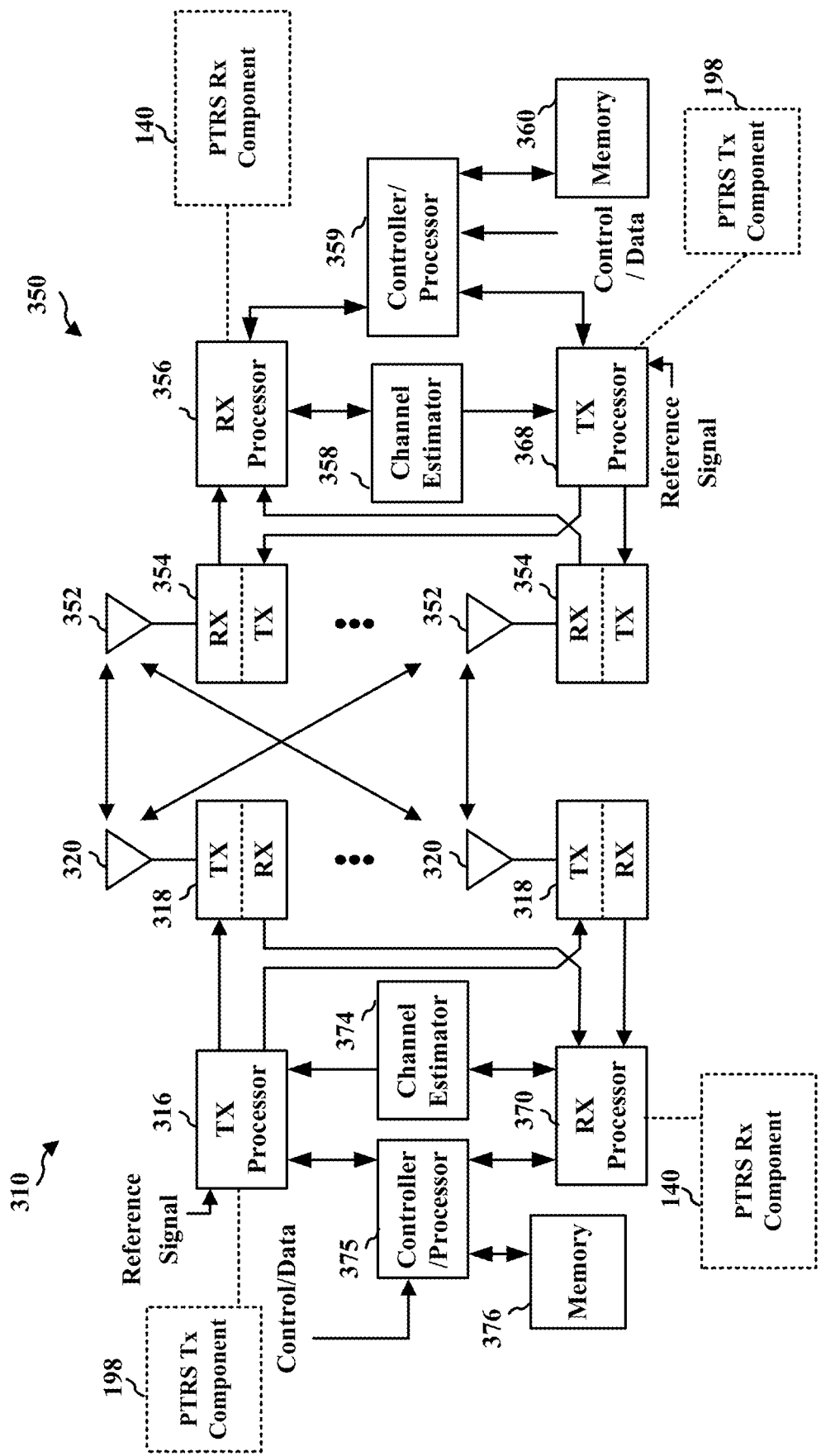
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIB s), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the PTRS Tx component 198 or the PTRS Rx component 140 of FIG. 1.

At least one of the TX processor 316, the RX processor 370, and the controller/processor 375 may be configured to perform aspects in connection with the PTRS Tx component 198 or the PTRS Rx component 140 of FIG. 1.

Figure 4:
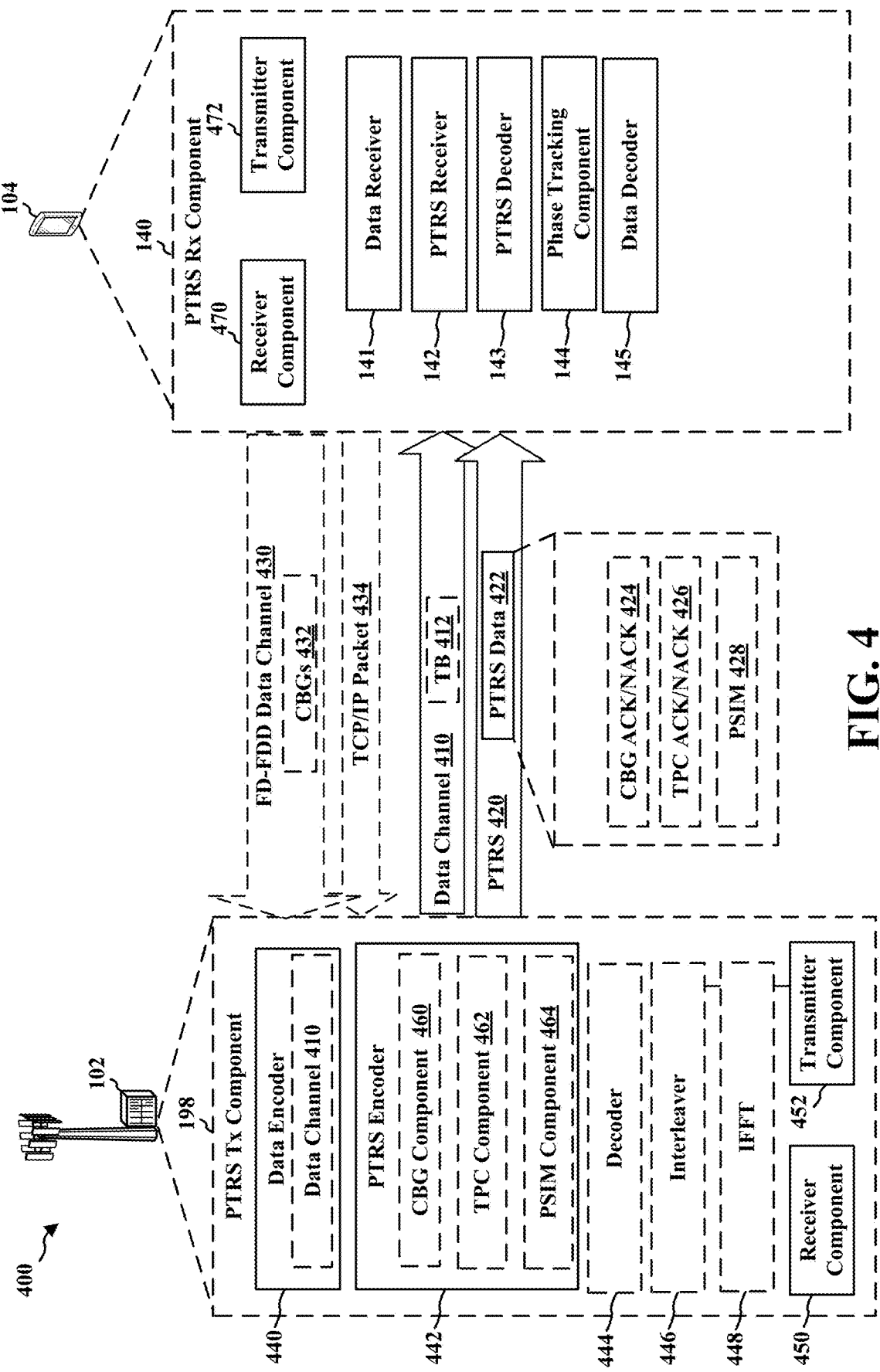
FIG. 4 is a diagram illustrating example communications and components of a base station and a UE.

FIG. 4 is a diagram 400 illustrating example communications and components of a base station 102 and a UE 104. The UE 104 may include the PTRS Rx component 140. The base station 102 may include the PTRS Tx component 198. The diagram 400 shows an arrangement for downlink communications, but an uplink transmission may be performed with the PTRS Tx component 198 in the UE 104 and the PTRS Rx component 140 in the base station 102.

As discussed above regarding FIG. 1, PTRS Rx component 140 may include the data receiver 141, the PTRS receiver 142, the PTRS decoder 143, the phase tracking component 144, and the data decoder 145. The PTRS Rx component 140 may also include a receiver component 470 and a transmitter component 472. The receiver component 470 may include, for example, a radio frequency (RF) receiver for receiving the signals described herein. The transmitter component 472 may include for example, an RF transmitter for transmitting the signals described herein. In an aspect, the receiver component 470 and the transmitter component 472 may be co-located in a transceiver.

The PTRS Tx component 198 may include the data encoder 440, the PTRS encoder 442, the decoder 444, the interleaver 446, and the IFFT component 448. The PTRS Tx component 198 may also include a receiver component 450 and a transmitter component 452. The receiver component 450 may include, for example, a RF receiver for receiving the signals described herein. The transmitter component 452 may include for example, an RF transmitter for transmitting the signals described herein. In an aspect, the receiver component 450 and the transmitter component 452 may be co-located in a transceiver.

The PTRS Tx component 198 may transmit the data channel 410, which may include one or more transport blocks 412. The PTRS Tx component 198 may also transmit the PTRS 420, which may carry PTRS data 422. The PTRS data 422 may include one or more of a CBG ACK/NACK 424, a TPC ACK/NACK 426, or a PSIM 428. The PTRS 420 may be interleaved with the data channel 410. That is, the PTRS 420 may be assigned resource elements (REs) in the same symbol as the data channel 410. Accordingly, the data channel 410 and the PTRS 420 may be frequency domain multiplexed.

The PTRS Tx component 198 may optionally receive a full duplex—frequency division duplexing (FD-FDD) data channel 430 transmitted by, for example, the UE 104. The FD-FDD data channel 430 may be concurrently transmitted with the data channel 410. For example, at frequencies in FR2, it may be possible to spatially separate an uplink transmission and a downlink transmission within the same band such that a device (e.g., base station 102 or UE 104) is able to concurrently transmit and receive. In an aspect, the FD-FDD data channel 430 may carry code block groups (CBGs) 432, which may be smaller units than a transport block that are also separately decodable. For example, a CBG 432 may be aligned with a symbol such that all of the REs of a symbol belong to the CBG 432. Accordingly, the CBG 432 is decodable based on the single symbol. Other ratios between CBGs 432 and symbols may be used. In any case, the CBGs 432 may be smaller than the TB 412 and one or more CBGs 432 may be decoded while the TB 412 is being transmitted. In an aspect, the PTRS data 422 may include a CBG ACK/NACK 424 that indicates a decoding status of one or more CBGs 432. The PTRS data 422 may be encoded for each symbol such that the CBG ACK/NACK 424 for a CBG 432 received during transmission of the TB 412 may be transmitted on the PTRS 420 along with the TB 412. Accordingly, the PTRS 420 may provide CBG level acknowledgment of a data channel, which may improve retransmission latency.

In another aspect, the PTRS Tx component 198 may optionally receive a TCP/IP packet 434. For example, the TCP/IP packet 434 may be received on the FD-FDD data channel 430 or may be received on another channel. In any case, the TCP may operate at a higher layer and a TPC ACK/NACK 426 may be received at the PHY layer during transmission of the TB 412. In an aspect, the PTRS data 422 may include a TPC ACK/NACK 426 that indicates a reception status of the TCP/IP packet 434. The TPC ACK/NACK 426 may be encoded and transmitted on the PTRS 420 without waiting for a separate uplink grant for a new TB 412. Accordingly, the PTRS 420 may provide improved latency for TPC ACK/NACK 426.

In another aspect, the PTRS data 422 may include a PSIM 428. One technique for reducing PAPR for an OFDMA transmission is to clip peaks that exceed a threshold amplitude from samples of the signal prior to transmission and to replace the peak amplitudes with set values. For example, the clipped signal may be the data channel 410 that is transmitted on a shared channel with a relatively high modulation scheme. A power amplifier in the transmitter component 452 may operate in an efficient region due to the reduced PAPR. A message (e.g., the PSIM 428) including information describing the clipped peaks may be transmitted on the PTRS 420 using a relatively lower modulation scheme. The receiver may receive both the shared channel including the clipped signal and the PSIM 428. The receiver may reconstruct the original signal based on the clipped signal and the PSIM 428. The receiver may then decode the reconstructed signal. PSIM transmissions may be utilized in either downlink or uplink direction.

The PTRS encoder 442 may generate the PTRS 420 based on PTRS data 422 including one or more of the CBG ACK/NACK 424, TPC ACK/NACK 426, or PSIM 428. The PTRS encoder 442 may optionally include a CBG component 460 that encodes the CBG ACK/NACK 424, a TPC component 462 that encodes the TPC ACK/NACK 426, and/or a PSIM component 464 that encodes the PSIM 428. The PTRS encoder 442 may encode the PTRS data 422 with a second MCS that is lower than the MCS for the data channel 410. For example, the MCS for the PTRS 420 may be a MCS that is used for a control channel. As another example, the MCS for the PTRS 420 may be based on an offset from the MCS for the data channel 410. For instance, the MCS for the PTRS 420 may correspond to an SNR that is 10-20 dB lower than the MCS for the data channel 410. The MCS for the PTRS 420 may target a low block error rate (BLER), for example $10^{-2}$ or $10^{-3}$. Accordingly, reception of the PTRS 420 may be more reliable than reception of the data channel 410.

Figure 5:
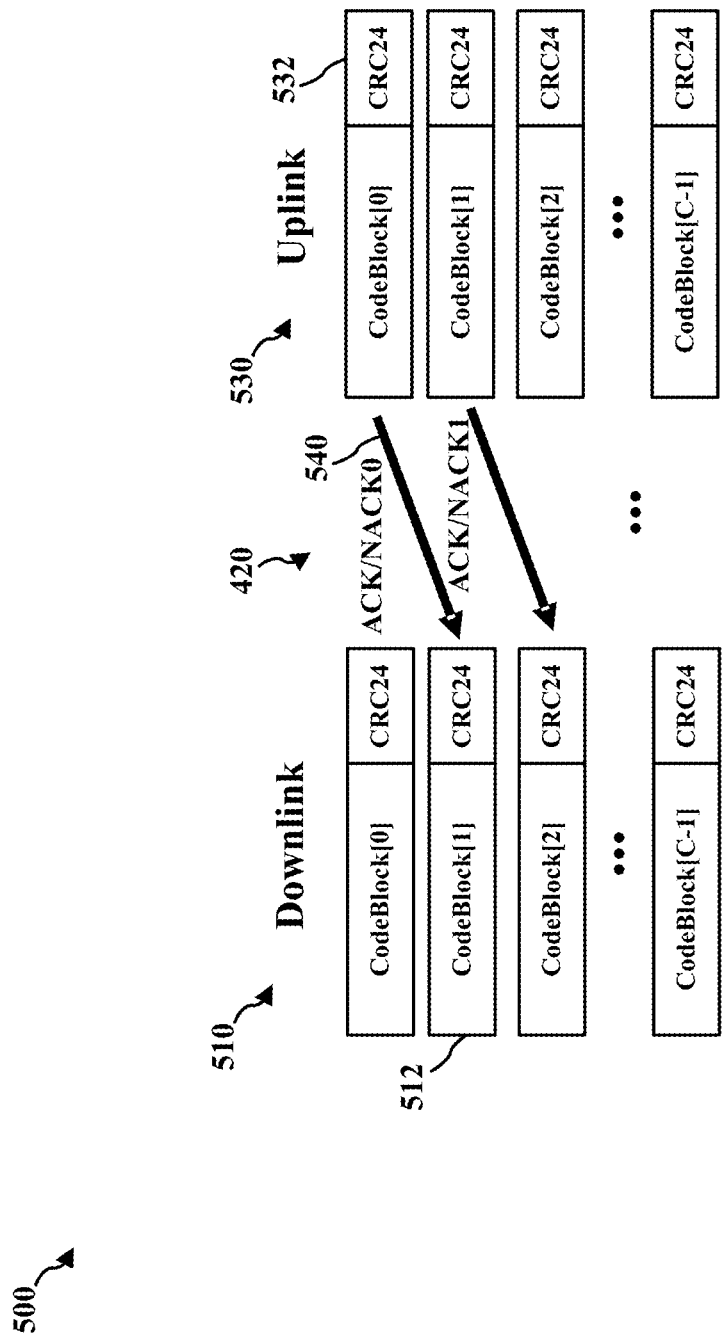
FIG. 5 is a diagram illustrating an example of code block group level acknowledgments.

FIG. 5 is a diagram 500 illustrating an example of code block group level acknowledgments. As the carrier frequency increases, there is better separation (in dB) between antennas given the same separation distance. This will allow full duplex FDD (FD-FDD) in high bands (e.g. sub THz). For example, the base station 102 may transmit a downlink transmission 510 (e.g., data channel 410) at the same time that the UE 104 transmits an uplink transmission 530 (e.g., FD-FDD data channel 430). Each of the downlink transmission 510 and the uplink transmission 530 may include multiple code blocks (e.g., CBGs 432) that are separately decodable. For example, the base station 102 may receive the uplink transmission 530 and decode CodeBlock[0] to determine an ACK/NACK 540 for the CodeBlock[0] based on the CRC 532. Because the CodeBlock[1] 512 for the downlink transmission 510 may already be encoded when the ACK/NACK 540 is determined, the ACK/NACK 540 may not be transmitted on the downlink transmission 510 until a next transport block. The PTRS 420, however, may be encoded independently for every symbol. Accordingly, the ACK/NACK 540 may be encoded onto the PTRS 420 just prior to transmission and transmitted with the CodeBlock[1] 512. Therefore, the PTRS 420 may convey CBG ACK/NACK 540 of a previous CBG. Thus, transmitting the CBG ACK/NACK 424 on the PTRS 420 may allow latency, which is a key performance indicator, on the order of symbols rather than slots or transport blocks.

Figure 6:
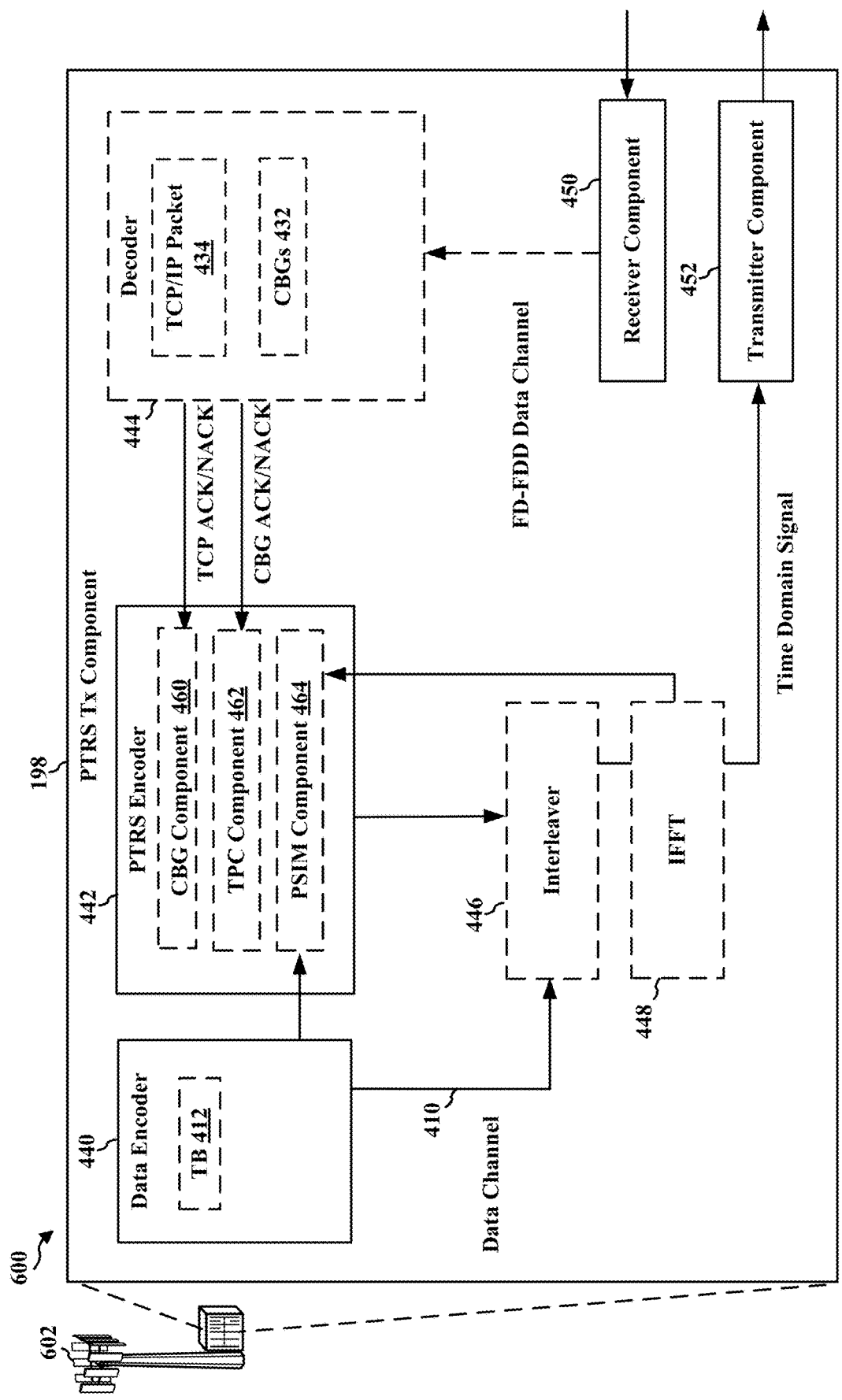
FIG. 6 is a conceptual data flow diagram illustrating the data flow between different means/components in an example transmitting device.

FIG. 6 is a conceptual data flow diagram 600 illustrating the data flow between different means/components in an example base station 602, which may be an example of the base station 102 including the PTRS Tx component 198. Alternatively, for uplink communications, the UE 104 may include the PTRS Tx component 198.

The data encoder 440 may generate the transport block (TB) 412 for the data channel 410, the transport block encoded using the first MCS. For example, the data encoder 440 may obtain data from a data buffer and the first MCS from a scheduler. The data encoder 440 may encode the data according to a coding rate and map the encoded data to modulation symbols according to the first MCS. The data encoder 440 may provide the encoded symbols of the data channel 410 to the interleaver 446. In an implementation, the data encoder 440 may also provide the encoded symbols of the data channel 410 to the PSIM component 464.

The PTRS encoder 442 may obtain PTRS data 422 from one or more sources such as the data encoder 440, the decoder 444, or the IFFT component 448. For example, the decoder 444 may receive an uplink data channel such as the FD-FDD data channel. The decoder 444 may decode the CBGs 432 and/or the TCP/IP packet 434. The decoder 444 may provide the CBG ACK/NACK 424 based on the decoding status of the CBGs 432 and/or the TCP ACK/NACK 426 based on the reception status of the TCP/IP packet 434 to the PTRS encoder 442. More specifically, the decoder 444 may provide the CBG ACK/NACK 424 to the CBG component 460 and/or provide the TCP ACK/NACK 426 to the TPC component 462. In an implementation, the PSIM component 464 may generate the PSIM 428 based on either the data channel 410 or a time domain signal based on the data channel 410 and the PTRS 420. In any case, the PTRS encoder 442 component 464 may encode the PTRS data 422 onto the PTRS 420 according to the second MCS. The PTRS encoder 442 may provide the PTRS 420 to the interleaver 446.

The interleaver 446 receives the data channel 410 from the data encoder 440 and receives the PTRS from the PTRS encoder 442. The interleaver 446 may interleave REs for the data channel 410 and the PTRS 420 (as well as other reference signals) to generate a frequency domain multiplexed (FDM) signal. The interleaver 446 may provide the FDM signal to the IFFT component 448. The IFFT component 448 may perform an IFFT that transforms the FDM signal into a time domain signal. In an aspect, the IFFT component 448 may provide the time domain signal to the PSIM component 464. The IFFT component 448 may provide the time domain signal to the transmitter component 452 for transmission to the UE 104. Accordingly, the PTRS Tx component 198 may transmit the PTRS 420 interleaved with the data channel 410.

Figure 7:
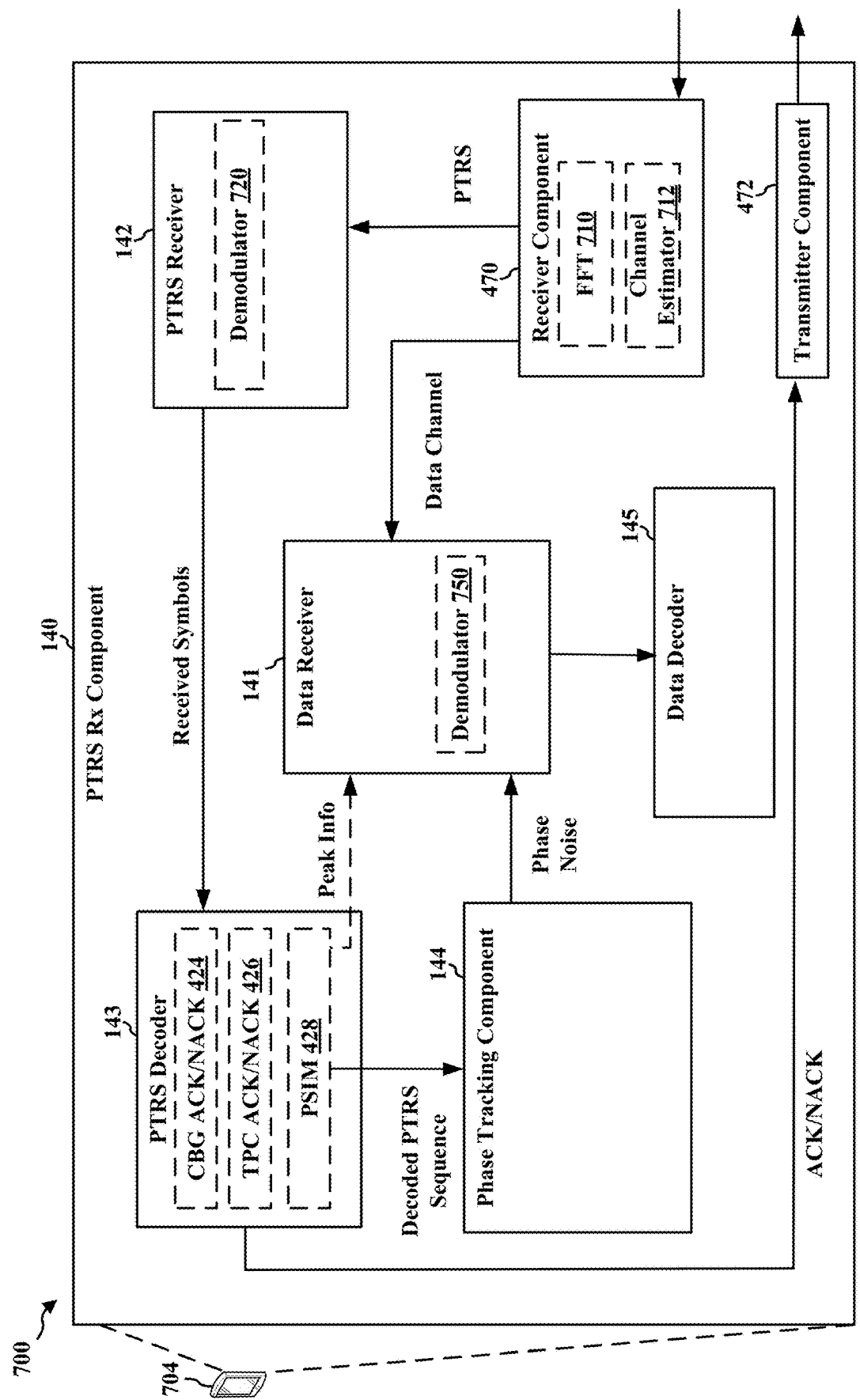
FIG. 7 is a conceptual data flow diagram illustrating the data flow between different means/components in an example receiving device.

FIG. 7 is a conceptual data flow diagram 700 illustrating the data flow between different means/components in an example UE 704, which may be an example of the UE 104 and include the PTRS Rx component 140. Alternatively, for uplink communications, the base station 102 may include the PTRS Rx component 140.

The receiver component 470 may receive the data channel 410 and the PTRS 420 from the base station 102 as a time domain signal. The receiver component 470 may include a channel estimator 712 that estimates the channel (e.g., based on reference signals). The receiver component 470 may perform an FFT 710 to transform the time domain signal into a frequency domain multiplexed signal. The receiver component 470 may provide the data channel 410 to the data receiver 141 and provide the PTRS to the PTRS receiver 142.

The PTRS receiver 142 may receive the PTRS 420 via the receiver component 470. The PTRS receiver 142 may include a demodulator 720 that demodulates the PTRS to obtain received symbols. The PTRS 420 may be encoded with the second MCS that is lower than the first MCS of the data channel 410. The PTRS receiver 142 may provide the received symbols to the PTRS decoder 143.

The PTRS decoder 143 may decode the received symbols to recover the PTRS data 422. When the PTRS data 422 includes the CBG ACK/NACK 424 or the TPC ACK/NACK 426, the PTRS decoder 143 may provide an ACK/NACK signal to the transmitter component 472 to indicate whether to retransmit data associated with the received ACK/NACK. When the PTRS data 422 includes the PSIM 428, the PTRS decoder 143 may extract peak information from the PSIM 428 and provide the peak information to the data receiver 141. The PTRS decoder 143 may also provide the decoded PTRS sequence to the phase tracking component 144.

The phase tracking component 144 may track phase noise using the decoded PTRS sequence as a transmitted sequence of the PTRS. For example, the phase tracking component 144 may compare the decoded PTRS sequence to the received signal to determine the phase noise associated with the received signal. The phase tracking component 144 may provide the phase noise to the data receiver 141.

The data receiver 141 may receive the data channel 410 via the receiver component 470. The data receiver 141 may receive the phase noise from the phase tracking component 144. The data receiver 141 may receive peak information from the PTRS decoder 143 when the PTRS data 422 includes the PSIM 428. The data receiver 141 may improve the received data channel 410 based on the phase noise and/or the peak information. For example, the data receiver 141 may add the samples that were clipped from the data channel 410 to the received data channel 410. The data receiver 141 may subtract the phase noise from the received data channel 410. The data receiver 141 may include a demodulator 750 that performs demodulation according to the MCS of the data channel 410 to generate modulation symbols and assemble a transport block. The data receiver 141 may provide the transport block to the data decoder 145.

The data decoder 145 may decode the transport block for the data channel 410 based on the first MCS and the tracked phase noise. For example, the data decoder 145 may decode the transport block to obtain the original data.

Figure 8:
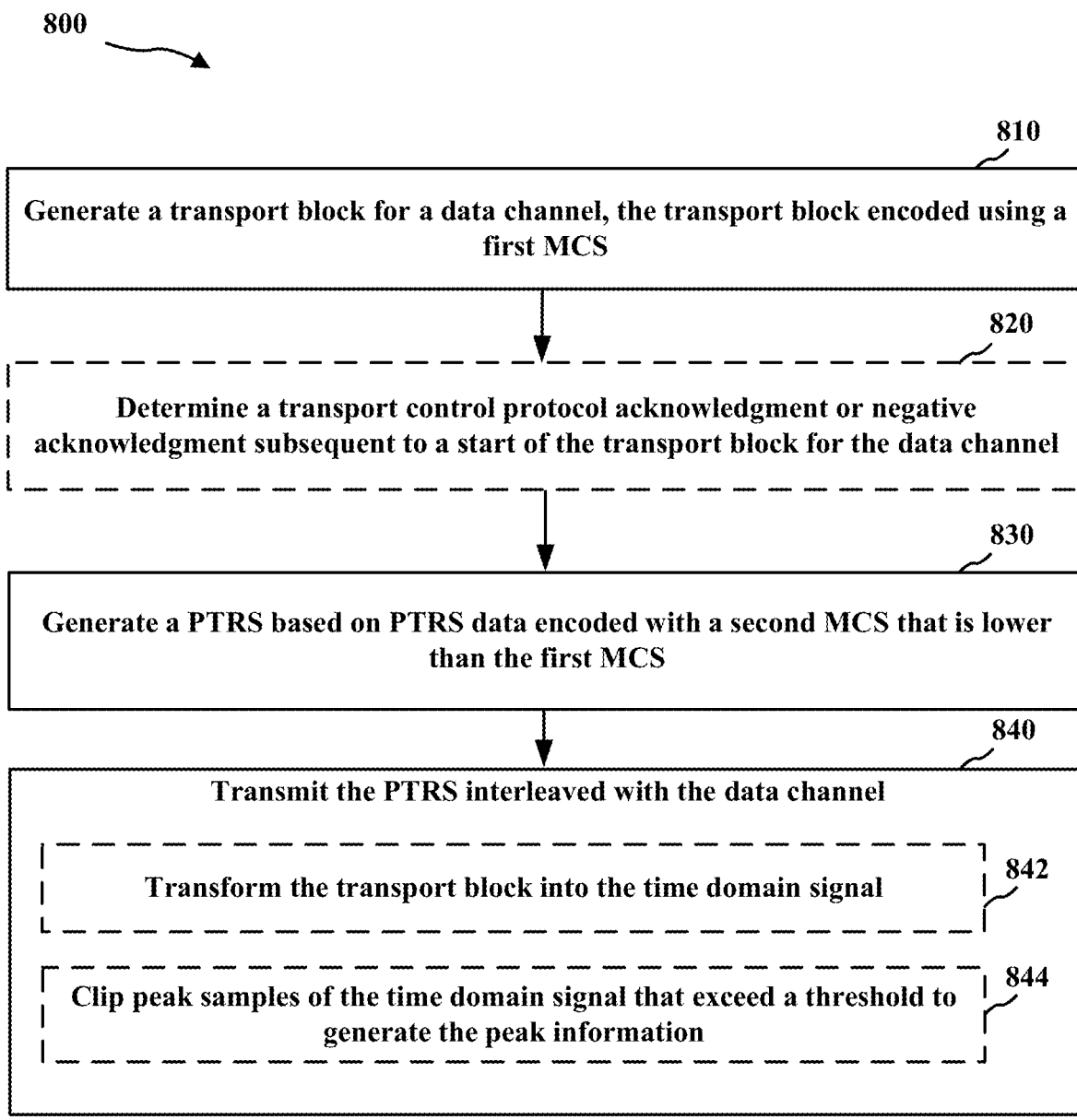
FIG. 8 is a flowchart of an example of a method of wireless communication for a transmitting device.

FIG. 8 is a flowchart of an example method 800 for transmitting an enhanced PTRS. The method 800 may be performed by a base station (such as the base station 102, which may include the memory 376 and which may be the entire base station 102 or a component of the base station 102 such as the PTRS Tx component 198, TX processor 316, the RX processor 370, or the controller/processor 375). The method 800 may be performed by the PTRS Tx component 198 in communication with the PTRS Rx component 140 of the UE 104. In an aspect, for uplink communications, the method 800 may be performed by a UE (such as the UE 104, which may include the memory 360 and which may be the entire UE 104 or a component of the UE 104 such as the PTRS Tx component 198, TX processor 368, the RX processor 356, or the controller/processor 359).

At block 810, the method 800 may include generating a transport block for a data channel, the transport block encoded using a first MCS. In an aspect, for example, the base station 102, the controller/processor 375, and/or the TX processor 316 may execute the PTRS Tx component 198 and/or the data encoder 440 to generate a transport block 412 for a data channel 410, the transport block 412 encoded using a first MCS. In some implementations, the transport block 412 may include a plurality of code blocks. Accordingly, the base station 102, the controller/processor 375, and/or the TX processor 316 executing the PTRS Tx component 198 and/or the data encoder 440 may provide means for generating a transport block for a data channel, the transport block encoded using a first MCS.

At block 820, the method 800 may optionally include determining a transport control protocol acknowledgment or negative acknowledgment subsequent to a start of the transport block for the data channel. In an aspect, for example, the base station 102, the controller/processor 375, and/or the TX processor 316 may execute the PTRS Tx component 198 and/or the decoder 444 to determine the transport control protocol acknowledgment or negative acknowledgment (e.g., TPC ACK/NACK 426) subsequent to a start of the transport block 412 for the data channel. Similarly, the decoder 444 may determine a CBG level ACK/NACK 424 subsequent to a start of the transport block 412 for the data channel. Accordingly, the base station 102, the controller/processor 375, and/or the TX processor 316 executing the PTRS Tx component 198 and/or the decoder 444 may provide means for determining the transport control protocol acknowledgment or negative acknowledgment subsequent to a start of the transport block for the data channel.

At block 830, the method 800 may include generating a PTRS based on PTRS data encoded with a second MCS that is lower than the first MCS. In an aspect, for example, the base station 102, the controller/processor 375, and/or the TX processor 316 may execute the PTRS Tx component 198 and/or the PTRS encoder 442 to generate a PTRS 420 based on PTRS data 422 encoded with a second MCS that is lower than the first MCS. In an aspect, the PTRS data includes an acknowledgment or negative acknowledgment (e.g., CBG ACK/NACK 424) for a code block group 432. The code block group 432 may be code block group of a received transport block that overlaps the transport block 412 for the data channel 410 in a time domain or a frequency domain. In another aspect (e.g., when block 820 is performed), the PTRS data 422 includes a transport control protocol acknowledgment or negative acknowledgment (e.g., TPC ACK/NACK 426). In another aspect, the PTRS data 422 includes a PSIM 428 indicating peak information that was clipped from a time domain signal of the transport block 412. In view of the foregoing, the base station 102, the controller/processor 375, and/or the TX processor 316 executing the PTRS Tx component 198 and/or the PTRS encoder 442 may provide means generating a PTRS based on PTRS data encoded with a second MCS that is lower than the first MCS.

At block 840, the method 800 may include transmitting the PTRS interleaved with the data channel. In an aspect, for example, the base station 102, the controller/processor 375, and/or the TX processor 316 may execute the PTRS Tx component 198 and/or the transmitter component 452 to transmit the PTRS 420 interleaved with the data channel 410. In an aspect, the interleaver 446 may interleave the data channel 410 and the PTRS 420. In an aspect, at sub-block 842, the block 840 may optionally include transforming the transport block into the time domain signal. For example, the IFFT component 448 may transform the transport block 412 into the time domain signal. At sub-block 844, the block 840 may optionally include clipping peak samples of the time domain signal that exceed a threshold to generate the peak information. For instance, the PSIM component 464 may clip the peak samples of the time domain signal that exceed a threshold to generate the peak information. Accordingly, the base station 102, the controller/processor 375, and/or the TX processor 316 executing the PTRS Tx component 198 and/or the transmitting component 452 may provide means for transmitting the PTRS interleaved with the data channel.

Figure 9:
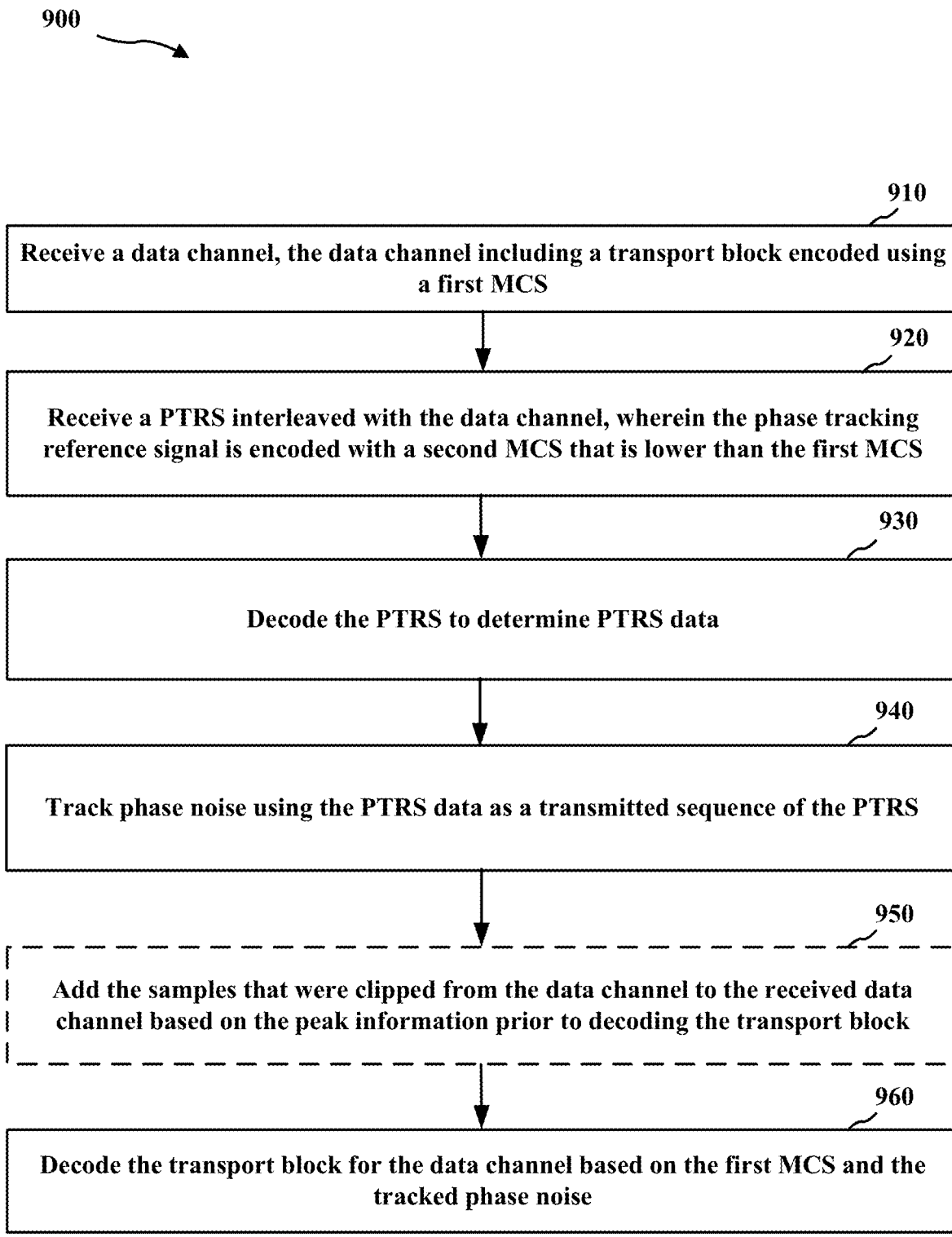
FIG. 9 is a flowchart of an example of a method of wireless communication for a receiving device.

FIG. 9 is a flowchart of an example method 900 for receiving an enhanced PTRS. The method 900 may be performed by a UE (such as the UE 104, which may include the memory 360 and which may be the entire UE 104 or a component of the UE 104 such as the PTRS Rx component 140, TX processor 368, the RX processor 356, or the controller/processor 359). The method 900 may be performed by the PTRS Rx component 140 in communication with the PTRS Tx component 198 of the base station 102. For uplink communications, the method 900 may be performed by a base station including the PTRS Rx component 140.

At block 910, the method 900 may include receiving a data channel. The data channel may include a transport block encoded using a first MCS. In an aspect, for example, the UE 104, the RX processor 356 and/or the controller/processor 359 may execute the PTRS Rx component 140 and/or the data receiver 141 to receive a data channel 410. The data channel 410 may include the transport block 412 encoded using a first MCS. Accordingly, the UE 104, the RX processor 356, and/or the controller/processor 359 executing the PTRS Rx component 140 and/or the data receiver 141 may provide means for receiving a data channel, the data channel including a transport block encoded using a first MCS.

At block 920, the method 900 may include receiving a PTRS interleaved with the data channel. The PTRS may be encoded with a second MCS that is lower than the first MCS. In an aspect, for example, the UE 104, the RX processor 356 and/or the controller/processor 359 may execute the PTRS Rx component 140 and/or the PTRS receiver 142 to include receiving the PTRS 420 interleaved with the data channel 410. The PTRS 420 may be encoded with a second MCS that is lower than the first MCS. Accordingly, the UE 104, the RX processor 356, and/or the controller/processor 359 executing the PTRS Rx component 140 and/or the data receiver 141 may provide means include receiving a PTRS interleaved with the data channel, where the PTRS is encoded with a second MCS that is lower than the first MCS.

At block 930, the method 900 may include decoding the PTRS to determine PTRS data. In an aspect, for example, the UE 104, the RX processor 356 and/or the controller/processor 359 may execute the PTRS Rx component 140 and/or the PTRS decoder 143 to decode the PTRS 420 to determine PTRS data 422. In an aspect, the PTRS data includes an acknowledgment or negative acknowledgment (e.g., CBG ACK/NACK 424) for a code block group 432. The code block group 432 may be code block group of a received transport block that overlaps the transport block 412 for the data channel 410 in a time domain or a frequency domain. In another aspect, the PTRS data 422 includes a transport control protocol acknowledgment or negative acknowledgment (e.g., TPC ACK/NACK 426). In another aspect, the PTRS data 422 includes a PSIM 428 indicating peak information that was clipped from a time domain signal of the transport block 412. Accordingly, the UE 104, the RX processor 356, and/or the controller/processor 359 executing the PTRS Rx component 140 and/or the PTRS receiver 142 may provide means for decoding the PTRS to determine PTRS data.

At block 940, the method 900 may include tracking phase noise using the PTRS data as a transmitted sequence of the PTRS. In an aspect, for example, the UE 104, the RX processor 356 and/or the controller/processor 359 may execute the PTRS Rx component 140 and/or the phase tracking component 144 to track phase noise using the PTRS data 422 as a transmitted sequence of the PTRS 420. Accordingly, the UE 104, the RX processor 356, and/or the controller/processor 359 executing the PTRS Rx component 140 and/or the phase tracking component 144 may provide means for tracking phase noise using the PTRS data as a transmitted sequence of the PTRS.

At block 950, the method 900 may optionally include adding the samples that were clipped from the data channel to the received data channel based on the peak information prior to decoding the transport block. In an aspect, for example, the UE 104, the RX processor 356 and/or the controller/processor 359 may execute the PTRS Rx component 140, the data receiver 141 and/or the PSIM component 464 (e.g., when the PTRS data 422 includes the PSIM 428) to add the samples that were clipped from the data channel to the received data channel based on the peak information prior to decoding the transport block. Accordingly, the UE 104, the RX processor 356, and/or the controller/processor 359 executing the PTRS Rx component 140, the data receiver 141 and/or the PSIM component 464 may provide means for adding the samples that were clipped from the data channel to the received data channel based on the peak information prior to decoding the transport block.

At block 960, the method 900 may include decoding the transport block for the data channel based on the first MCS and the tracked phase noise. In an aspect, for example, the UE 104, the TX processor 368 and/or the controller/processor 359 may execute the PTRS Rx component 140 and/or the data decoder 145 to decode the transport block 412 for the data channel 410 based on the first MCS and the tracked phase noise. Accordingly, the UE 104, the TX processor 368, and/or the controller/processor 359 executing the PTRS Rx component 140 and/or the data decoder 145 may provide means for decoding the transport block for the data channel based on the first MCS and the tracked phase noise.

The following provides an overview of aspects of the present disclosure:

Aspect 1: A method for wireless communication at a UE, comprising: receiving a data channel, the data channel including a transport block encoded using a first modulation and coding scheme (MCS); receiving a phase tracking reference signal (PTRS) interleaved with the data channel, wherein the PTRS is encoded with a second MCS that is lower than the first MCS; decoding the PTRS to determine PTRS data; tracking phase noise using the PTRS data as a transmitted sequence of the PTRS; and decoding the transport block for the data channel based on the first MCS and the tracked phase noise.

Aspect 2: The method of aspect 1, wherein the PTRS data includes an acknowledgment or a negative acknowledgment for a code block group.

Aspect 3: The method of aspect 2, wherein the code block group is a code block group of a transmitted transport block that overlaps the transport block for the data channel in a time domain or a frequency domain.

Aspect 4: The method of any of aspects 1-3, wherein the PTRS data includes a transport control protocol acknowledgment or negative acknowledgment.

Aspect 5: The method of aspect 4, wherein the transport control protocol acknowledgment or the negative acknowledgment is determined subsequent to a start of the transport block for the data channel.

Aspect 6: The method of any of aspects 1-5, wherein the PTRS data includes a peak suppression information message (PSIM) indicating peak information for samples that were clipped from the data channel prior to transmission.

Aspect 7: The method of aspect 6, further comprising adding the samples that were clipped from the data channel to the received data channel based on the peak information prior to decoding the transport block.

Aspect 8: A method of wireless communication at a base station, comprising: generating a transport block for a data channel, the transport block encoded using a first modulation and coding scheme (MCS); generating a phase tracking reference signal (PTRS) based on PTRS data encoded with a second MCS that is lower than the first MCS; and transmitting the PTRS interleaved with the data channel.

Aspect 9: The method of aspect 8, wherein the PTRS data includes an acknowledgment or negative acknowledgment for a code block group.

Aspect 10: The method of aspect 9, wherein the code block group is a code block group of a received transport block that overlaps the transport block for the data channel in a time domain or a frequency domain.

Aspect 11: The method of any of aspects 8-10, wherein the PTRS data includes a transport control protocol acknowledgment or negative acknowledgment.

Aspect 12: The method of aspect 11, further comprising determining the transport control protocol acknowledgment or the negative acknowledgment subsequent to a start of the transport block for the data channel.

Aspect 13: The method of any of aspects 8-12, wherein the PTRS data includes a peak suppression information message (PSIM) indicating peak information that was clipped from a time domain signal of the transport block.

Aspect 14: The method of aspect 13, wherein the transmitting comprises: transforming the transport block into the time domain signal; and clipping peak samples of the time domain signal that exceed a threshold to generate the peak information.

Aspect 15: The method of aspect 13 or 14, wherein generating the PTRS comprises generating the PTRS for each symbol of the data channel.

Aspect 16: An apparatus for wireless communication, comprising: a memory storing computer-executable instructions; and at least one processor coupled to the memory and configured to execute the computer-executable instructions to: receive a data channel, the data channel including a transport block encoded using a first modulation and coding scheme (MCS); receive a phase tracking reference signal (PTRS) interleaved with the data channel, wherein the PTRS is encoded with a second MCS that is lower than the first MCS; decode the PTRS to determine PTRS data; track phase noise using the PTRS data as a transmitted sequence of the PTRS; and decode the transport block for the data channel based on the first MCS and the tracked phase noise.

Aspect 17: The apparatus of aspect 16, wherein the PTRS data includes an acknowledgment or a negative acknowledgment for a code block group.

Aspect 18: The apparatus of aspect 17, wherein the code block group is a code block group of a transmitted transport block that overlaps the transport block for the data channel in a time domain or a frequency domain.

Aspect 19: The apparatus of any of aspects 16-18, wherein the PTRS data includes a transport control protocol acknowledgment or negative acknowledgment.

Aspect 20: The apparatus of aspect 19, wherein the transport control protocol acknowledgment or the negative acknowledgment is determined subsequent to a start of the transport block for the data channel.

Aspect 21: The apparatus of any of aspects 16-20, wherein the PTRS data includes a peak suppression information message (PSIM) indicating peak information for samples that were clipped from the data channel prior to transmission.

Aspect 22: The apparatus of aspect 21, wherein the at least one processor is configured to add the samples that were clipped from the data channel to the received data channel based on the peak information prior to decoding the transport block.

Aspect 23: An apparatus for wireless communication, comprising: a memory storing computer-executable instructions; and at least one processor coupled to the memory and configured to execute the computer-executable instructions to: generate a transport block for a data channel, the transport block encoded using a first modulation and coding scheme (MCS); generate a phase tracking reference signal (PTRS) based on PTRS data encoded with a second MCS that is lower than the first MCS; and transmit the PTRS interleaved with the data channel.

Aspect 24: The apparatus of aspect 23, wherein the PTRS data includes an acknowledgment or negative acknowledgment for a code block group.

Aspect 25: The apparatus of aspect 24, wherein the code block group is a code block group of a received transport block that overlaps the transport block for the data channel in a time domain or a frequency domain.

Aspect 26: The apparatus of any of aspects 23-25, wherein the PTRS data includes a transport control protocol acknowledgment or negative acknowledgment.

Aspect 27: The apparatus of aspect 26, wherein the at least one processor is configured to determine the transport control protocol acknowledgment or the negative acknowledgment subsequent to a start of the transport block for the data channel.

Aspect 28: The apparatus of any of aspects 23-27, wherein the PTRS data includes a peak suppression information message (PSIM) indicating peak information that was clipped from a time domain signal of the transport block.

Aspect 29: The apparatus of aspect 28, wherein the at least one processor is configured to: transform the transport block into the time domain signal; and clip peak samples of the time domain signal that exceed a threshold to generate the peak information.

Aspect 30: The apparatus of aspect 28 or 29, wherein the at least one processor is configured to generate the PTRS for each symbol of the data channel.

Aspect 31: An apparatus for wireless communication, comprising: means for receiving a data channel, the data channel including a transport block encoded using a first modulation and coding scheme (MCS); means for receiving a phase tracking reference signal (PTRS) interleaved with the data channel, wherein the PTRS is encoded with a second MCS that is lower than the first MCS; means for decoding the PTRS to determine PTRS data; means for tracking phase noise using the PTRS data as a transmitted sequence of the PTRS; and means for decoding the transport block for the data channel based on the first MCS and the tracked phase noise.

Aspect 32: The apparatus of aspect 31, wherein the PTRS data includes an acknowledgment or a negative acknowledgment for a code block group.

Aspect 33: The apparatus of aspect 32, wherein the code block group is a code block group of a transmitted transport block that overlaps the transport block for the data channel in a time domain or a frequency domain.

Aspect 34: The apparatus of any of aspects 31-33, wherein the PTRS data includes a transport control protocol acknowledgment or negative acknowledgment.

Aspect 35: The apparatus of aspect 34, wherein the transport control protocol acknowledgment or the negative acknowledgment is determined subsequent to a start of the transport block for the data channel.

Aspect 36: The apparatus of any of aspects 31-35, wherein the PTRS data includes a peak suppression information message (PSIM) indicating peak information for samples that were clipped from the data channel prior to transmission.

Aspect 37: The apparatus of aspect 36, wherein the means for decoding the transport block is configured to add the samples that were clipped from the data channel to the received data channel based on the peak information prior to decoding the transport block.

Aspect 38: An apparatus for wireless communication, comprising: means for generating a transport block for a data channel, the transport block encoded using a first modulation and coding scheme (MCS); means for generating a phase tracking reference signal (PTRS) based on PTRS data encoded with a second MCS that is lower than the first MCS; and means for transmitting the PTRS interleaved with the data channel.

Aspect 39: The apparatus of aspect 38, wherein the PTRS data includes an acknowledgment or negative acknowledgment for a code block group.

Aspect 40: The apparatus of aspect 39, wherein the code block group is a code block group of a received transport block that overlaps the transport block for the data channel in a time domain or a frequency domain.

Aspect 41: The apparatus of any of aspects 38-40, wherein the PTRS data includes a transport control protocol acknowledgment or negative acknowledgment.

Aspect 42: The apparatus of aspect 41, wherein the means for generating the PTRS is configured to determine the transport control protocol acknowledgment or the negative acknowledgment subsequent to a start of the transport block for the data channel.

Aspect 43: The apparatus of any of aspects 38-42, wherein the PTRS data includes a peak suppression information message (PSIM) indicating peak information that was clipped from a time domain signal of the transport block.

Aspect 44: The apparatus of aspect 43, wherein the means for transmitting is configured to: transform the transport block into the time domain signal; and clip peak samples of the time domain signal that exceed a threshold to generate the peak information.

Aspect 45: The apparatus of aspect 43 or 44, wherein the means for generating the PTRS is configured to generate the PTRS for each symbol of the data channel.

Aspect 46: A non-transitory computer-readable medium storing computer executable code, the code when executed by a processor causes the processor to: receive a data channel, the data channel including a transport block encoded using a first modulation and coding scheme (MCS); receive a phase tracking reference signal (PTRS) interleaved with the data channel, wherein the PTRS is encoded with a second MCS that is lower than the first MCS; decode the PTRS to determine PTRS data; track phase noise using the PTRS data as a transmitted sequence of the PTRS; and decode the transport block for the data channel based on the first MCS and the tracked phase noise.

Aspect 47: The non-transitory computer-readable medium of aspect 46, wherein the PTRS data includes an acknowledgment or a negative acknowledgment for a code block group.

Aspect 48: The non-transitory computer-readable medium of aspect 47, wherein the code block group is a code block group of a transmitted transport block that overlaps the transport block for the data channel in a time domain or a frequency domain.

Aspect 49: The non-transitory computer-readable medium of any of aspects 46-48, wherein the PTRS data includes a transport control protocol acknowledgment or negative acknowledgment.

Aspect 50: The non-transitory computer-readable medium of aspect 49, wherein the transport control protocol acknowledgment or the negative acknowledgment is determined subsequent to a start of the transport block for the data channel.

Aspect 51: The non-transitory computer-readable medium of any of aspects 46-50, wherein the PTRS data includes a peak suppression information message (PSIM) indicating peak information for samples that were clipped from the data channel prior to transmission.

Aspect 52: The non-transitory computer-readable medium of aspect 51, further comprising code to add the samples that were clipped from the data channel to the received data channel based on the peak information prior to decoding the transport block.

Aspect 53: A non-transitory computer-readable medium storing computer executable code, the code when executed by a processor causes the processor to: generate a transport block for a data channel, the transport block encoded using a first modulation and coding scheme (MCS); generate a phase tracking reference signal (PTRS) based on PTRS data encoded with a second MCS that is lower than the first MCS; and transmit the PTRS interleaved with the data channel.

Aspect 54: The non-transitory computer-readable medium of aspect 53, wherein the PTRS data includes an acknowledgment or negative acknowledgment for a code block group.

Aspect 55: The non-transitory computer-readable medium of aspect 54, wherein the code block group is a code block group of a received transport block that overlaps the transport block for the data channel in a time domain or a frequency domain.

Aspect 56: The non-transitory computer-readable medium of any of aspects 53-55, wherein the PTRS data includes a transport control protocol acknowledgment or negative acknowledgment.

Aspect 57: The non-transitory computer-readable medium of aspect 56, further comprising code to determine the transport control protocol acknowledgment or the negative acknowledgment subsequent to a start of the transport block for the data channel.

Aspect 58: The non-transitory computer-readable medium of any of aspects 53-57, wherein the PTRS data includes a peak suppression information message (PSIM) indicating peak information that was clipped from a time domain signal of the transport block.

Aspect 59: The non-transitory computer-readable medium of aspect 58, wherein the code to transmit comprises code to: transform the transport block into the time domain signal; and clip peak samples of the time domain signal that exceed a threshold to generate the peak information.

Aspect 60: The non-transitory computer-readable medium of aspect 58 or 59, wherein the code to generate the PTRS comprises code to generate the PTRS for each symbol of the data channel.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The invention claimed is:

1. A method of wireless communication, comprising:
   receiving a data channel, the data channel including a transport block encoded using a first modulation and coding scheme (MCS);
   receiving a phase tracking reference signal (PTRS) interleaved with the data channel, wherein the PTRS is encoded with a second MCS that is lower than the first MCS;
   decoding the PTRS to determine PTRS data, wherein the PTRS data includes one or more of: an acknowledgment or a negative acknowledgment for a code block group, a transport control protocol acknowledgment or negative acknowledgment, or a peak suppression information message (PSIM) indicating peak information for samples that were clipped from the data channel prior to transmission;
   tracking phase noise using the PTRS data as a transmitted sequence of the PTRS; and
   decoding the transport block for the data channel based on the first MCS and the tracked phase noise.

2. The method of claim 1, wherein the PTRS data includes the acknowledgment or the negative acknowledgment for the code block group.

3. The method of claim 2, wherein the code block group is a code block group of a transmitted transport block that overlaps the transport block for the data channel in a time domain or a frequency domain.

4. The method of claim 1, wherein the PTRS data includes the transport control protocol acknowledgment or negative acknowledgment.

5. The method of claim 4, wherein the transport control protocol acknowledgment or the negative acknowledgment is determined subsequent to a start of the transport block for the data channel.

6. The method of claim 1, wherein the PTRS data includes the PSIM.

7. The method of claim 6, further comprising adding the samples that were clipped from the data channel to the received data channel based on the peak information prior to decoding the transport block.

8. A method of wireless communication, comprising:
generating a transport block for a data channel, the transport block encoded using a first modulation and coding scheme (MCS);
generating a phase tracking reference signal (PTRS) based on PTRS data encoded with a second MCS that is lower than the first MCS, wherein the PTRS data includes one or more of: an acknowledgment or a negative acknowledgment for a code block group, a transport control protocol acknowledgment or negative acknowledgment, or a peak suppression information message (PSIM) indicating peak information for samples that were clipped from a time domain signal of the transport block; and
transmitting the PTRS interleaved with the data channel.

9. The method of claim 8, wherein the PTRS data includes the acknowledgment or the negative acknowledgment for the code block group.

10. The method of claim 9, wherein the code block group is a code block group of a received transport block that overlaps the transport block for the data channel in a time domain or a frequency domain.

11. The method of claim 8, wherein the PTRS data includes the transport control protocol acknowledgment or negative acknowledgment.

12. The method of claim 11, further comprising determining the transport control protocol acknowledgment or the negative acknowledgment subsequent to a start of the transport block for the data channel.

13. The method of claim 8, wherein the PTRS data includes the PSIM.

14. The method of claim 13, wherein the transmitting comprises:
transforming the transport block into the time domain signal; and
clipping peak samples of the time domain signal that exceed a threshold to generate the peak information.

15. The method of claim 13, wherein generating the PTRS comprises generating the PTRS for each symbol of the data channel.

16. An apparatus for wireless communication, comprising:
a memory storing computer-executable instructions; and
at least one processor coupled to the memory and configured to execute the computer-executable instructions to:
receive a data channel, the data channel including a transport block encoded using a first modulation and coding scheme (MCS);
receive a phase tracking reference signal (PTRS) interleaved with the data channel, wherein the PTRS is encoded with a second MCS that is lower than the first MCS;
decode the PTRS to determine PTRS data, wherein the PTRS data includes one or more of: an acknowledgment or a negative acknowledgment for a code block group, a transport control protocol acknowledgment or negative acknowledgment, or a peak suppression information message (PSIM) indicating peak information for samples that were clipped from the data channel prior to transmission;
track phase noise using the PTRS data as a transmitted sequence of the PTRS; and
decode the transport block for the data channel based on the first MCS and the tracked phase noise.

17. The apparatus of claim 16, wherein the PTRS data includes the acknowledgment or the negative acknowledgment for the code block group.

18. The apparatus of claim 17, wherein the code block group is a code block group of a transmitted transport block that overlaps the transport block for the data channel in a time domain or a frequency domain.

19. The apparatus of claim 16, wherein the PTRS data includes the transport control protocol acknowledgment or negative acknowledgment.

20. The apparatus of claim 19, wherein the transport control protocol acknowledgment or the negative acknowledgment is determined subsequent to a start of the transport block for the data channel.

21. The apparatus of claim 16, wherein the PTRS data includes the PSIM.

22. The apparatus of claim 21, wherein the at least one processor is configured to add the samples that were clipped from the data channel to the received data channel based on the peak information prior to decoding the transport block.

23. An apparatus for wireless communication, comprising:
a memory storing computer-executable instructions; and
at least one processor coupled to the memory and configured to execute the computer-executable instructions to:
generate a transport block for a data channel, the transport block encoded using a first modulation and coding scheme (MCS);
generate a phase tracking reference signal (PTRS) based on PTRS data encoded with a second MCS that is lower than the first MCS, wherein the PTRS data includes one or more of: an acknowledgment or a negative acknowledgment for a code block group, a transport control protocol acknowledgment or negative acknowledgment, or a peak suppression information message (PSIM) indicating peak information for samples that were clipped from a time domain signal of the transport block; and
transmit the PTRS interleaved with the data channel.

24. The apparatus of claim 23, wherein the PTRS data includes the acknowledgment or the negative acknowledgment for the code block group.

25. The apparatus of claim 24, wherein the code block group is a code block group of a received transport block that overlaps the transport block for the data channel in a time domain or a frequency domain.

26. The apparatus of claim 23, wherein the PTRS data includes the transport control protocol acknowledgment or negative acknowledgment.

27. The apparatus of claim 26, wherein the at least one processor is configured to determine the transport control protocol acknowledgment or the negative acknowledgment subsequent to a start of the transport block for the data channel.

28. The apparatus of claim 23, wherein the PTRS data includes the PSIM.

29. The apparatus of claim 28, wherein the at least one processor is configured to:
transform the transport block into the time domain signal; and
clip peak samples of the time domain signal that exceed a threshold to generate the peak information.

30. The apparatus of claim 28, wherein the at least one processor is configured to generate the PTRS for each symbol of the data channel.

* * * * *